(12) United States Patent
Hattori et al.

(10) Patent No.: US 9,784,364 B2
(45) Date of Patent: Oct. 10, 2017

(54) PLANETARY CARRIER

(71) Applicant: AISIN AW CO., LTD., Anjo-shi, Aichi-ken (JP)

(72) Inventors: Nakatsune Hattori, Chiryu (JP); Motoshi Asano, Anjo (JP); Tsubasa Deguchi, Anjo (JP); Keisuke Nakashima, Nishio (JP); Takeshi Torii, Chiryu (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/035,260

(22) PCT Filed: Nov. 19, 2014

(86) PCT No.: PCT/JP2014/080617
§ 371 (c)(1),
(2) Date: May 9, 2016

(87) PCT Pub. No.: WO2015/076291
PCT Pub. Date: May 28, 2015

(65) Prior Publication Data
US 2016/0290492 A1 Oct. 6, 2016

(30) Foreign Application Priority Data
Nov. 25, 2013 (JP) .................................. 2013-242953

(51) Int. Cl.
*F16H 57/08* (2006.01)
*F16H 57/04* (2010.01)
*F16H 3/66* (2006.01)

(52) U.S. Cl.
CPC ........... *F16H 57/082* (2013.01); *F16H 3/663* (2013.01); *F16H 57/04* (2013.01); *F16H 57/043* (2013.01);

(Continued)

(58) Field of Classification Search
None
See application file for complete search history.

(56) References Cited

U.S. PATENT DOCUMENTS

| 6,422,971 | B1 | 7/2002 | Katou et al. |
| 2003/0100399 | A1* | 5/2003 | Hayabuchi ............ F16H 57/082 475/331 |

(Continued)

FOREIGN PATENT DOCUMENTS

| JP | 2001-108027 A | 4/2001 |
| JP | 2006-125425 A | 5/2006 |

(Continued)

OTHER PUBLICATIONS

Feb. 24, 2016 International Search Report issued in International Patent Application No. PCT/JP2014/080617.

*Primary Examiner* — Justin Holmes
*Assistant Examiner* — Timothy M Hannon
(74) *Attorney, Agent, or Firm* — Oliff PLC

(57) ABSTRACT

A planetary carrier where the second pinion gears are disposed so as to be at least partially located in the spaces between the adjacent bridge portions, an outer peripheral surface of each of the bridge portions is provided with a spline onto which a friction engagement plate constituting a friction engagement element is fitted, an inner peripheral surface of each of the bridge portions is provided with a pair of wall portions that extend in the axial direction along side edges on both sides of each of the bridge portions and protrude radially inward, and each of the bridge portions is provided with a plurality of oil holes through which an inside and an outside of each of the bridge portions communicate with each other.

12 Claims, 9 Drawing Sheets

(52) U.S. Cl.
CPC ..... *F16H 57/0473* (2013.01); *F16H 57/0479* (2013.01); *F16H 57/0484* (2013.01); *F16H 57/08* (2013.01); *F16H 2200/006* (2013.01); *F16H 2200/2007* (2013.01); *F16H 2200/2046* (2013.01); *F16H 2200/2048* (2013.01); *F16H 2200/2066* (2013.01); *F16H 2200/2082* (2013.01)

(56) References Cited

U.S. PATENT DOCUMENTS

| | | |
|---|---|---|
| 2006/0089228 A1 | 4/2006 | Nakagawa et al. |
| 2010/0105515 A1* | 4/2010 | Goleski ................ F16H 57/082 475/341 |
| 2014/0206498 A1 | 7/2014 | Harada et al. |

FOREIGN PATENT DOCUMENTS

| | | |
|---|---|---|
| JP | 2008-089051 A | 4/2008 |
| JP | 2008-121808 A | 5/2008 |
| JP | 2014-101925 A | 6/2014 |
| WO | 2013/088860 A1 | 6/2013 |
| WO | 2014/077407 A1 | 5/2014 |

* cited by examiner

FIG. 2

|   |     | C-1 | C-2 | C-3 | C-4 | B-1 | B-2 | F-1 |
|---|-----|-----|-----|-----|-----|-----|-----|-----|
| D | 1st | ○   |     |     |     |     | ●   | ○   |
|   | 2nd | ○   |     |     |     | ○   |     |     |
|   | 3rd | ○   |     | ○   |     |     |     |     |
|   | 4th | ○   |     |     | ○   |     |     |     |
|   | 5th | ○   | ○   |     |     |     |     |     |
|   | 6th |     | ○   |     | ○   |     |     |     |
|   | 7th |     | ○   | ○   |     |     |     |     |
|   | 8th |     | ○   |     |     | ○   |     |     |
| REV1 |  |     |     | ○   |     |     | ○   |     |
| REV2 |  |     |     |     | ○   |     | ○   |     |

※○: ENGAGED
●: ENGAGED DURING OPERATION OF ENGINE BRAKE

PLANETARY CARRIER

BACKGROUND

The present disclosure relates to a planetary carrier of a planetary gear including first and second pinion gears having axial lengths different from each other.

Conventionally, as a planetary carrier of this type, a planetary carrier has been known which rotatably supports short pinion gears and long pinion gears of a Ravigneaux type planetary gear constituting a transmission (see Japanese Patent Application Publication No. 2008-089051, for example). This planetary carrier includes a carrier body and a carrier cover, and the carrier cover has an annular extension portion that surrounds the substantially entire short pinion gears and portions of the long pinion gears. The extension portion of the carrier cover constitutes a clutch hub of a clutch (C-2) that is disposed to surround the extension portion. On the outer peripheral side of a drum portion of the carrier body, a brake (B-2) and a one-way clutch (F-1) are arranged side by side.

SUMMARY

In the conventional planetary carrier described above, because the extension portion of the carrier cover is formed so as to surround the short pinion gears and portions of the long pinion gears, the outer diameter of the carrier cover tends to be larger, which makes it difficult to make the planetary carrier compact to improve the space efficiency in the transmission. When the planetary carrier functions as a hub of a friction engagement element such as a clutch as described above, hydraulic oil as a lubricating medium is required to be sufficiently supplied to friction engagement plates supported by the planetary carrier as a hub.

In view of this, an exemplary aspect of the present disclosure makes a compact planetary carrier which rotatably supports first and second pinion gears having axial lengths different from each other and onto which friction engagement plates of a friction engagement element are fitted, and to make it possible to sufficiently supply a lubricating medium to the friction engagement plates.

A planetary carrier according to an exemplary aspect of the present disclosure is planetary carrier of a planetary gear including a plurality of first pinion gears and a plurality of second pinion gears having longer axial lengths than those of the first pinion gears, the planetary carrier including: a carrier body including a plurality of first shaft support portions that each support one end of a first pinion shaft inserted into each of the first pinion gears, and also including a plurality of second shaft support portions that are arranged alternately with the first shaft support portions along a circumferential direction and each support one end of a second pinion shaft inserted into each of the second pinion gears; a carrier cover that supports the other end of the first pinion shaft and the other end of the second pinion shaft; and a plurality of bridge portions that extend in an axial direction of the first and the second pinion shafts between the first shaft support portions and the carrier cover, and are arranged side by side in the circumferential direction with spaces between the bridge portions, in which the second pinion gears are disposed so as to be at least partially located in the spaces between the adjacent bridge portions, an outer peripheral surface of each of the bridge portions is provided with a spline onto which a friction engagement plate constituting a friction engagement element is fitted, an inner peripheral surface of each of the bridge portions is provided with a pair of wall portions that extend in the axial direction along side edges on both sides of each of the bridge portions and protrude radially inward, and each of the bridge portions is provided with a plurality of oil holes through which an inside and an outside of each of the bridge portions communicate with each other.

As in this planetary carrier, the bridge portions are provided so as to be arranged side by side in the circumferential direction between the first shaft support portions of the carrier body and the carrier cover, and the second pinion gears are disposed so as to be at least partially located in the spaces between the adjacent bridge portions, whereby the outer diameter (occupied space) of the planetary carrier around the bridge portions can be reduced. In this planetary carrier, the carrier cover and the inner peripheral surface and the pair of wall portions of each of the bridge portions define an oil accumulating portion that stores hydraulic oil scattered from the inside (axis side). Thus, the hydraulic oil scattered from the inside can be stored inside the bridge portions so as to be prevented from being discharged outside through the spaces, and then the hydraulic oil as a lubricating medium can be supplied through the oil holes to the friction engagement plate fitted onto the spline. Consequently, while making the planetary carrier of the planetary gear including the first and the second pinion gears having axial lengths different from each other compact, it is possible to sufficiently supply hydraulic oil as a lubricating medium to the friction engagement plate supported by the bridge portions.

BRIEF DESCRIPTION OF THE DRAWINGS

FIG. 2 is an operation table illustrating a relation between shift speeds and operating states of clutches and brakes of a transmission included in the power transmission apparatus in the FIG. 1.

DETAILED DESCRIPTION OF EMBODIMENTS

Modes for carrying out the present disclosure will now be described with reference to the accompanying drawings.

Figure 1:
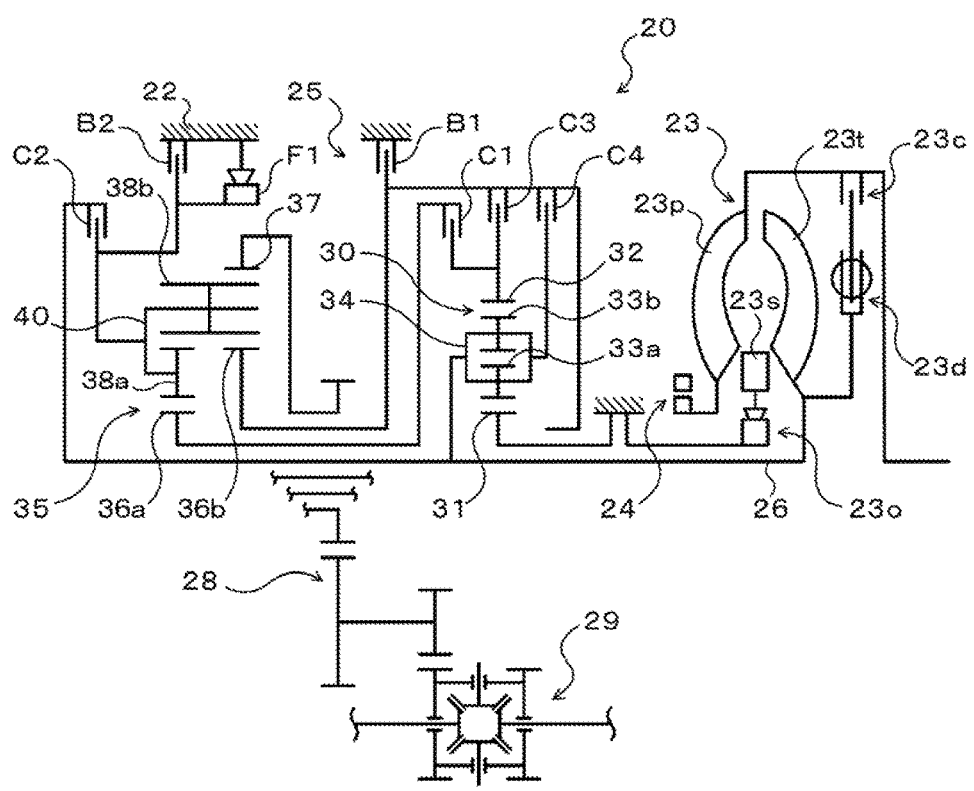
FIG. 1 is a schematic structure diagram illustrating a power transmission apparatus including a Ravigneaux type planetary gear having a planetary carrier according to the present disclosure.

FIG. 1 is a schematic structure diagram illustrating a power transmission apparatus 20 including a Ravigneaux type planetary gear having a planetary carrier according to the present disclosure. The power transmission apparatus 20 shown in FIG. 1 is an apparatus that is connected to a crankshaft of an engine (not shown) mounted on a front-wheel-drive vehicle, and can transmit power from the engine to right and left drive wheels (front wheels) (not shown). As shown in the figure, the power transmission apparatus 20 includes a transmission case 22, a starting device (fluid transmission apparatus) 23 accommodated in the transmission case 22, an oil pump 24, an automatic transmission 25, a gear mechanism (gear train) 28, and a differential gear (differential mechanism) 29.

The starting device 23 included in the power transmission apparatus 20 is structured as a torque converter including: a pump impeller 23$p$ on the input side connected to a crankshaft of the engine; a turbine runner 23$t$ on the output side connected to an input shaft (input member) 26 of the automatic transmission 25; a stator 23$s$ that is disposed inside the pump impeller 23$p$ and the turbine runner 23$t$ to rectify a flow of hydraulic oil (ATF, i.e., oil) from the turbine runner 23$t$ to the pump impeller 23$p$; a one-way clutch 23$o$ that restricts the rotation direction of the stator 23$s$ to one direction; a lockup clutch 23$c$; and a damper mechanism 23$d$. However, the starting device 23 may be structured as a fluid coupling that does not have the stator 23$s$.

The oil pump 24 is structured as a gear pump including: a pump assembly including a pump body and a pump cover; an external gear connected to the pump impeller 23$p$ of the starting device 23 via a hub; and an internal gear meshing with the external gear. The oil pump 24 is driven by power from the engine, sucks hydraulic oil stored in an oil pan (not shown), and pressure-feeds the hydraulic oil to a hydraulic control apparatus (not shown) that generates an oil pressure required by the starting device 23 and the automatic transmission 25.

The automatic transmission 25 is structured as an eight-speed transmission. As shown in FIG. 1, in addition to the input shaft 26, the automatic transmission 25 includes: a first planetary gear mechanism 30 of a double-pinion type; a second planetary gear mechanism 35 of a Ravigneaux type; and four clutches C1, C2, C3, and C4, two brakes B1 and B2, and a one-way clutch F1 that are configured to change power transfer paths from the input side to the output side.

The first planetary gear mechanism 30 of the automatic transmission 25 has: a sun gear 31 that is an external gear; a ring gear 32 that is an internal gear disposed concentrically with this sun gear 31; and a planetary carrier 34 rotatably (turnably) and revolvably holding a plurality sets of two pinion gears 33$a$ and 33$b$ meshing with each other, one of which meshes with the sun gear 31 and the other of which meshes with the ring gear 32. As shown in the figure, the sun gear 31 of the first planetary gear mechanism 30 is fixed to the transmission case 22, and the planetary carrier 34 of the first planetary gear mechanism 30 is coupled to the input shaft 26 so as to be rotatable together with the input shaft 26. The first planetary gear mechanism 30 is structured as what is called a reduction gear, and reduces the speed of power transmitted to the planetary carrier 34 being an input element to output the power from the ring gear 32 being an output element.

The second planetary gear mechanism 35 of the automatic transmission 25 has: a first sun gear 36$a$ and a second sun gear 36$b$ that are external gears; a ring gear 37 that is an internal gear disposed concentrically with the first and second sun gears 36$a$ and 36$b$; a plurality of short pinion gears 38$a$ meshing with the first sun gear 36$a$; a plurality of long pinion gears 38$b$ meshing with the second sun gear 36$b$ and the short pinion gears 38$a$ and also meshing with the ring gear 37; and a planetary carrier 40 rotatably (turnably) and revolvably holding the short pinion gears 38$a$ and the long pinion gears 38$b$. The ring gear 37 of the second planetary gear mechanism 35 functions as an output member of the automatic transmission 25, and power transmitted from the input shaft 26 to the ring gear 37 is transmitted to right and left drive wheels via the gear mechanism 28, the differential gear 29, and a drive shaft. The planetary carrier 40 is supported by the transmission case 22 via the one-way clutch F1, and the rotation direction of the planetary carrier 40 is restricted to one direction by the one-way clutch F1.

The clutch C1 is a multi-plate friction type hydraulic clutch (friction engagement element) that has a piston, a plurality of friction plates and separator plates, and a hydraulic servo including an oil chamber to which hydraulic oil is supplied, and can connect and disconnect the ring gear 32 of the first planetary gear mechanism 30 to and from the first sun gear 36$a$ of the second planetary gear mechanism 35. The clutch C2 is a multi-plate friction type hydraulic clutch that has a piston, a plurality of friction plates and separator plates, and a hydraulic servo including an oil chamber to which hydraulic oil is supplied, and can connect and disconnect the input shaft 26 to and from the planetary carrier 40 of the second planetary gear mechanism 35. The clutch C3 is a multi-plate friction type hydraulic clutch that has a piston, a plurality of friction plates and separator plates, and a hydraulic servo including an oil chamber to which hydraulic oil is supplied, and can connect and disconnect the ring gear 32 of the first planetary gear mechanism 30 to and from the second sun gear 36$b$ of the second planetary gear mechanism 35. The clutch C4 is a multi-plate friction type hydraulic clutch that has a piston, a plurality of friction plates and separator plates, and a hydraulic servo including an oil chamber to which hydraulic oil is supplied, and can connect and disconnect the planetary carrier 34 of the first planetary gear mechanism 30 to and from the second sun gear 36$b$ of the second planetary gear mechanism 35.

The brake B1 is a multi-plate friction type hydraulic brake that has a plurality of friction plates and separator plates and a hydraulic servo including an oil chamber to which hydraulic oil is supplied, and can hold the second sun gear 36$b$ of the second planetary gear mechanism 35 stationary to the transmission case 22 and can also release the second sun gear 36$b$ held stationary with respect to the transmission case 22. The brake B2 is a multi-plate friction type hydraulic brake that has a plurality of friction plates and separator plates and a hydraulic servo including an oil chamber to which hydraulic oil is supplied, and can hold the planetary carrier 40 of the second planetary gear mechanism 35 stationary to the transmission case 22 and can also release the planetary carrier 40 held stationary with respect to the transmission case 22.

The one-way clutch F1 is a clutch that includes an inner race coupled (fixed) to the planetary carrier 40 of the second planetary gear mechanism 35, an outer race, a plurality of sprags, a plurality of springs (leaf springs), and a retainer, and that transmits torque via the respective sprags when the outer race rotates in one direction with respect to the inner race, and also allows both of the races to relatively rotate when the outer race rotates in the other direction with respect to the inner race. However, the one-way clutch F1 may have a roller-type structure, for example, other than the sprag-type.

The clutches C1 to C4 and the brakes B1 and B2 operate with hydraulic oil supplied and discharged by the hydraulic control apparatus described above. FIG. 2 is an operation table illustrating a relation between shift speeds and operating states of the clutches C1 to C4, the brakes B1 and B2, and the one-way clutch F1 of the automatic transmission 25. The automatic transmission 25 controls the clutches C1 to C4 and the brakes B1 and B2 to achieve the states specified in the operation table in FIG. 2, thereby providing shift speeds of first to eighth forward speeds and shift speeds of first and second reverse speeds. Herein, at least any of the clutches C1 to C4 and the brake B2 except the brake B1 may be an intermeshing engagement element such as a dog clutch.

Figure 3:
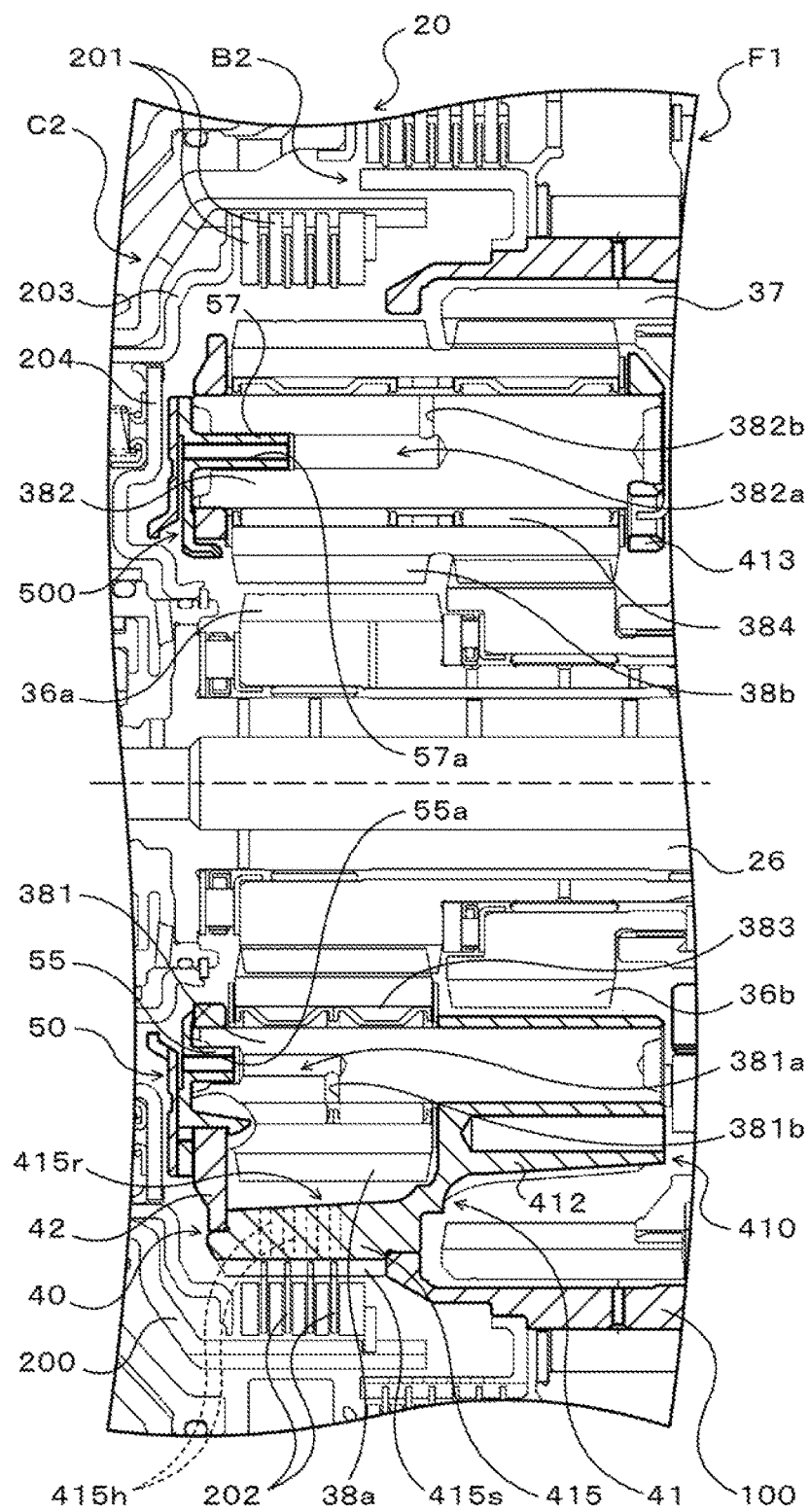
FIG. 3 is a partial sectional view illustrating a main part of the automatic transmission included in the power transmission apparatus.

FIG. 3 is a partial sectional view illustrating a main part of the automatic transmission 25 included in the power transmission apparatus 20. This drawing illustrates a structure around the clutch C2 of the automatic transmission 25 and the second planetary gear mechanism 35 of the Ravigneaux type.

As shown in FIG. 3, the clutch C2 that is disposed near the planetary carrier 40 and connects and disconnects the planetary carrier 40 to and from the input shaft 26 includes: a clutch drum 200; a plurality of separator plates (friction engagement plates) 201 and a backing plate; friction plates (friction engagement plates) 202 disposed alternately with the separator plates 201, for example; a piston 203; and a cancel plate (cancel oil-chamber defining member) 204. The clutch drum 200 is fixed to the input shaft 26 as a power input member to rotate together with the input shaft 26. The separator plates 201 are annular members both surfaces of which are smoothly formed and, together with the backing plate, are fitted onto splines formed on the inner peripheral surface of the clutch drum 200. The friction plates 202 are annular members on both surfaces of which friction materials are bonded.

The piston 203 is movably supported by an inner tubular portion (not shown) of the clutch drum 200, and together with the clutch drum 200 defines an engagement oil chamber (not shown). To the engagement oil chamber, engagement oil pressure (hydraulic oil) for engaging the clutch C2 is supplied from a hydraulic control apparatus (not shown) through an oil passage, for example, formed in the input shaft 26. Oil pressure in the engagement oil chamber acts on the piston 203, so that the piston 203 is moved in the axial direction of the input shaft 26 to press the separator plates 201 and the friction plates 202, whereby the clutch C2 is engaged. The cancel plate 204 together with the piston 203 defines a cancel oil chamber for canceling centrifugal oil pressure generated in the engagement oil chamber. Between the piston 203 and the cancel plate 204, a plurality of return springs are arranged at intervals in the circumferential direction.

Figure 4:
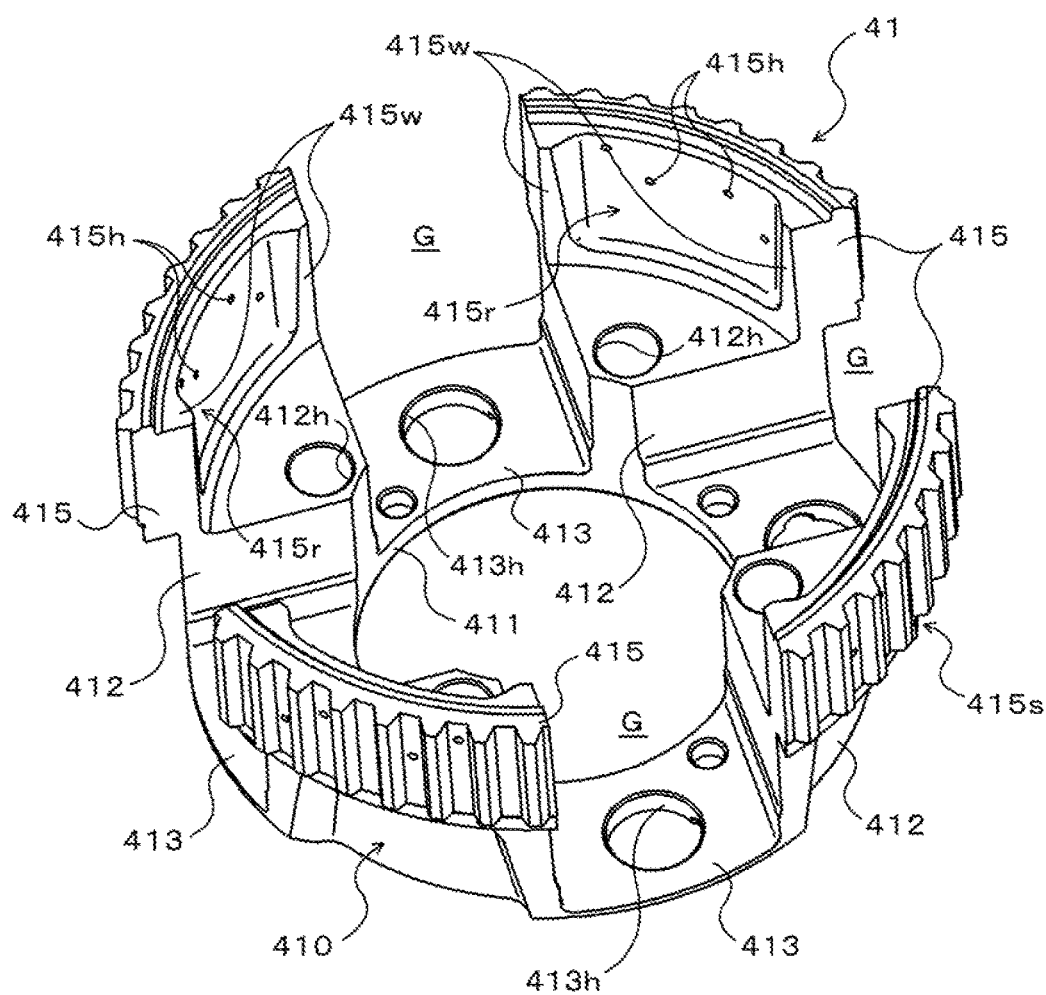
FIG. 4 is a perspective view illustrating a carrier body constituting the planetary carrier of the Ravigneaux type planetary gear included in the power transmission apparatus in FIG. 1.

The planetary carrier 40 of the second planetary gear mechanism 35 includes a carrier body 41 in a substantially cylindrical shape and an annular carrier cover 42 that is fixed to the carrier body 41, as shown in FIG. 3 and FIG. 4. The carrier body 41 is formed by hot forging a metal, for example, and includes: an annular shaft support portion 410 that supports one end of each of a plurality of (four in the present embodiment) first pinion shafts 381 inserted into the corresponding short pinion gear 38a and one end of each of a plurality of (four in the present embodiment) second pinion shafts 382 inserted into the corresponding long pinion gear 38b; and a plurality of (four in the present embodiment) bridge portions 415 that extend from the shaft support portion 410 in the axial direction of the first and the second pinion shafts 381 and 382 and the planetary carrier 40 and are arranged side by side in the circumferential direction with spaces G therebetween.

As shown in FIG. 4, the shaft support portion 410 has a center hole (circular hole) 411, formed in the center thereof, into which the input shaft 26, the first sun gear 36a, and the second sun gear 36b of the automatic transmission 25 are inserted, and also has a plurality of (four for each in the present embodiment) thick portions (first shaft support portions) 412 and plate-like thin portions (second shaft support portions) 413 that are arranged alternately (at 90° intervals in the present embodiment) around the center hole 411 along the circumferential direction. The thick portions 412 are molded integrally with the thin portions 413 so as to be arranged side by side in the circumferential direction with spaces G therebetween. Each of the thick portions 412 is provided with a shaft hole 412h into which one end of the first pinion shaft 381 inserted into the shaft hole of the short pinion gear 38a via a needle bearing 383 is inserted. Each of the thin portions 413 is provided with a shaft hole 413h into which one end of the second pinion shaft 382 inserted into the shaft hole of the short pinion gear 38a via a needle bearing 384 is inserted.

Furthermore, in the present embodiment, each of the bridge portions 415 extends from the outer peripheral portion of the distal end (upper end in FIG. 4) of each of the thick portions 412. Specifically, the shaft support portion 410 having the thick portions 412 and the thin portions 413 is molded integrally with the bridge portions 415. This makes it possible to appropriately secure the torsional rigidity of the carrier body 41, and consequently the torsional rigidity of the planetary carrier 40. As shown in FIG. 3 and FIG. 4, the respective bridge portions 415 are formed so as to protrude radially outward of the shaft support portion 410 (the thick portions 412), and function as a clutch hub of the clutch C2 that connects and disconnects the planetary carrier 40 to and from the input shaft 26n. Specifically, on the outer peripheral surface of each of the bridge portions 415, splines 415s are formed by cutting, for example. Onto the splines 415s, the friction plates 202 constituting the clutch C2 are fitted.

The inner peripheral surface of each of the bridge portions 415 is provided with a pair of (two) wall portions 415w that extend along side edges on both sides of the bridge portion 415 in the axial direction of the first and the second pinion shafts 381 and 382 and the planetary carrier 40. As shown in FIG. 4, the wall portions 415w protrude radially inward by a predetermined length from the side edges of each of the bridge portions 415. The wall portions 415w are molded simultaneously with each of the bridge portions 415 by hot forging, and the protruding lengths of the wall portions 415w are determined such that the wall portions 415w do not come in contact with the short pinion gears 38a or the long pinion gears 38b that are disposed inside the wall portions 415w. As a result of forming such a pair of wall portions 415w, on each of the bridge portions 415, a recess 415r is defined by the inner peripheral surface and the pair of wall portions 415w of the bridge portion 415. Furthermore, each of the bridge portions 415 is provided with a plurality of oil holes 415h at intervals. The oil holes 415h provide communication between the inside and the outside of the bridge portion 415, and are open at the inner peripheral surface of the bridge portion 415 and bottom lands of the splines 415s.

The carrier cover 42 is formed by performing press working on a metal plate, for example, in the present embodiment. The carrier cover 42 has: a center hole (circular hole) into which the input shaft 26, for example, is inserted; a shaft hole into which the other end of the first pinion shaft 381 is inserted; and a shaft hole into which the other end of the second pinion shaft 382 is inserted. The carrier cover 42 is fixed to the distal ends (left end in FIG. 3) of the bridge portions 415 of the carrier body 41 by welding, and forms a wall portion on the opposite side of the thick portions 412 via the recesses 415r formed on the bridge portion 415. The carrier cover 42 supports the other end of each of the first pinion shafts 381 inserted into the shaft hole of the corresponding short pinion gear 38a via the needle bearing 383, and also supports the other end of each of the second pinion shafts 382 inserted into the shaft hole of the corresponding long pinion gear 38b via the needle bearing 384.

Figure 5:
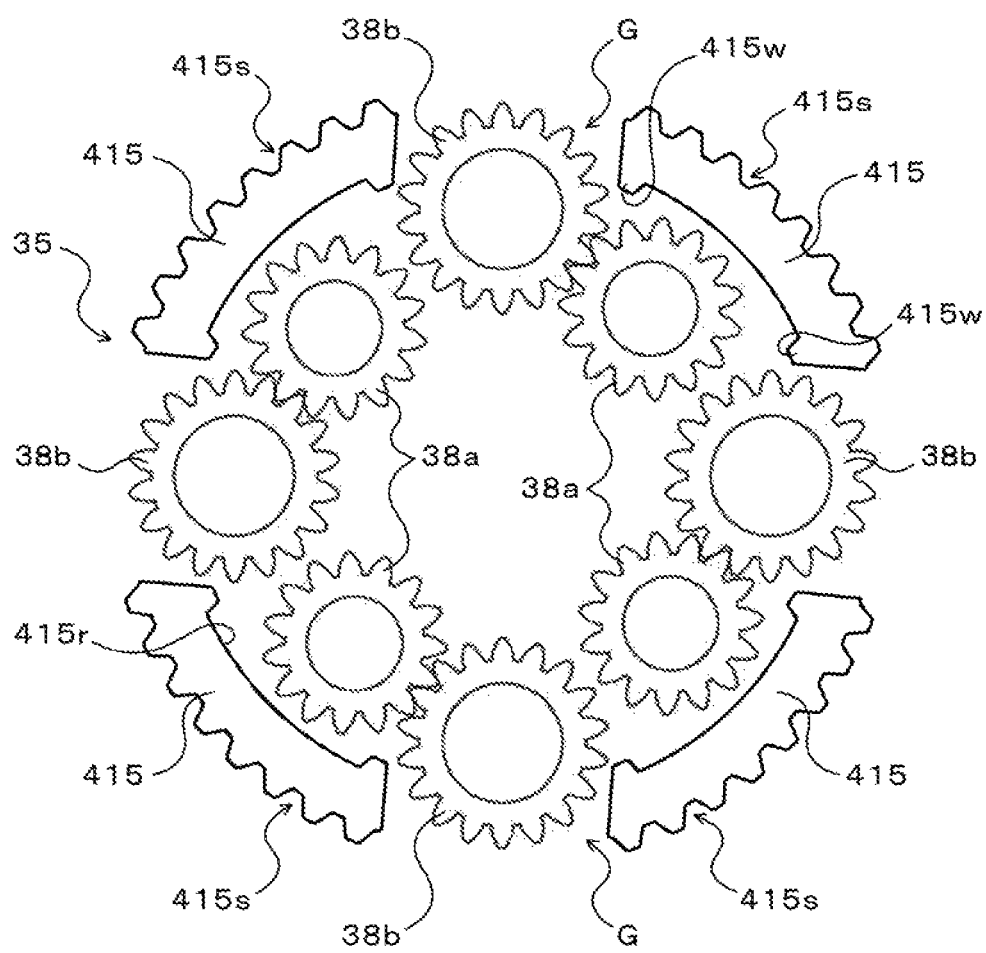
FIG. 5 is a schematic diagram illustrating the Ravigneaux type planetary gear included in the power transmission apparatus in FIG. 1.

Accordingly, as shown in FIG. 3, the respective short pinion gears 38a are disposed between the carrier cover 42 and the thick portions 412 of the carrier body 41 (the shaft support portion 410) and inside (radially inward of) the bridge portions 415. As shown in FIG. 3, the respective long pinion gears 38b are disposed between the carrier cover 42 and the thin portions 413 of the carrier body 41 (the shaft support portion 410). Furthermore, as shown in FIG. 5, each of the long pinion gears 38b meshes with the corresponding short pinion gear 38a, and is exposed outside through the space G of the planetary carrier 40 (the carrier body 41) to mesh with the ring gear 37 that is disposed to surround the thick portions 412. Specifically, the respective long pinion gears 38b are disposed so as to be at least partially located in the spaces G between the adjacent bridge portions 415 as shown in FIG. 5. In other words, a portion of each of the long pinion gears 38b is located within the range of radial thickness of the bridge portion 415. In this manner, the respective long pinion gears 38b having long lengths are exposed outside through the spaces G of the carrier body 41, whereby the outer diameter (occupied space) of the planetary carrier 40 around the respective bridge portions 415 can be reduced. In the present embodiment, the respective long pinion gears 38b are positioned radially inward of a circle (addendum circle of the splines 415s) circumscribing the respective bridge portions 415. Onto the ends of the respective bridge portions 415 of the planetary carrier 40 on the shaft support portion 410 side, an inner race 100 of the one-way clutch F1 is press-fitted so as to surround the ring gear 37, and is fixed by welding (see FIG. 3).

Figure 6:
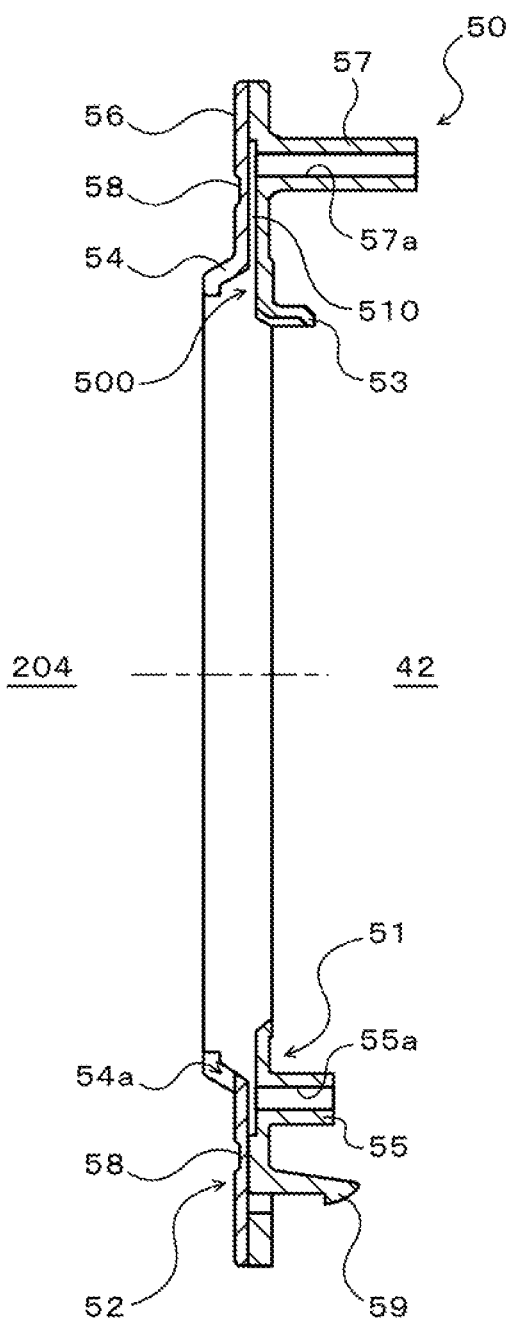
FIG. 6 is a sectional view illustrating an oil receiver attached to the planetary carrier of the Ravigneaux type planetary gear included in the power transmission apparatus in FIG. 1.

To the planetary carrier 40 of the second planetary gear mechanism 35 structured as described above, an oil receiver 50 that collects hydraulic oil scattered from the input shaft 26 side (inside) in the planetary carrier 40 is attached as shown in FIG. 3. In the present embodiment, the oil receiver 50 is fixed to the carrier cover 42 so as to be positioned between the carrier cover 42 of the planetary carrier 40 and the cancel plate 204 of the clutch C2. As shown in FIG. 6, the oil receiver 50 includes an annular first plate member 51 disposed on the carrier cover 42 side and an annular second plate member 52 that is integrated with the first plate member 51 by bonding, for example, and is disposed on the cancel plate 204 side.

The first plate member 51 has a plurality of oil-collecting walls 53 that extend in the extending direction (axial direction) of the axis (see the dashed and single-dotted line in FIG. 6) such that the oil-collecting walls 53 protrude from the inner periphery toward the carrier cover 42 (right side in FIG. 6) at intervals in the circumferential direction. In the present embodiment, the oil-collecting walls 53 are formed on the first plate member 51 at intervals in the circumferential direction so as to be prevented from coming into contact with the long pinion gears 38b when the oil receiver 50 is attached to the planetary carrier 40. However, when the oil-collecting walls 53 are prevented from coming into contact with the long pinion gears 38b, the oil-collecting walls 53 may be formed in an annular shape along the inner periphery of the first plate member 51.

On the first plate member 51, a plurality of (four for each in the present embodiment) first tubular portions (insertion portions) 55 and second tubular portions (insertion portions) 57 are formed so as to protrude toward the carrier cover 42 (right side in FIG. 6) in the extending direction of the axis. The first tubular portions (insertion portions) 55 each have an oil passage 55a inside, and are arranged at intervals in the circumferential direction such that each of the first tubular portions 55 can be inserted into an in-shaft axial oil passage (in-shaft oil passage) 381a (see FIG. 3) formed in the corresponding first pinion shaft 381. In the same manner, the second tubular portions (insertion portions) 57 each have an oil passage 57a inside, and are arranged at intervals in the circumferential direction such that each of the second tubular portions 57 can be inserted into an in-shaft axial oil passage (in-shaft oil passage) 382a (see FIG. 3) formed in the corresponding second pinion shaft 382. Furthermore, from the first plate member 51, a plurality of securing portions 59 that are each fitted (snap-fastened) into the center hole of the carrier cover 42 of the planetary carrier 40 extend toward the carrier cover 42 (right side in FIG. 6).

The second plate member 52 has an inclined wall portion 54 formed in an annular shape along the inner periphery thereof. The inclined wall portion 54 protrudes toward the cancel plate 204 and is inclined so as to be closer to the axis as being closer to the cancel plate 204. When the first and the second plate members 51 and 52 are integrated, an annular hydraulic-oil collecting portion (oil collecting portion) 500 that receives hydraulic oil scattered from the inside is defined by the inner peripheral portion and the oil-collecting walls 53 of the first plate member 51 and the inclined wall portion 54 of the second plate member 52. Furthermore, the first and the second plate members 51 and 52 surround the hydraulic-oil collecting portion 500 and also define an annular oil passage 510 that extends in the radial direction. The hydraulic-oil collecting portion 500, the oil passage 55a of each of the first tubular portions 55, and the oil passage 57a of each of the second tubular portions 57 communicate with each other through the oil passage 510.

In the present embodiment, as shown in FIG. 3, the oil receiver 50 is disposed between the carrier cover 42 of the planetary carrier 40 and the cancel plate 204 of the clutch C2. Accordingly, when the planetary carrier 40 that rotates during operation of the automatic transmission 25 moves in the axial direction of the input shaft, the outer peripheral portion of the second plate member 52 constituting the oil receiver 50 may come into sliding contact with a portion of the adjacent cancel plate 204. In view of this, on the second plate member 52, a sliding-contact surface 56 having a smooth annular shape is formed so as to surround the inclined wall portion 54. Furthermore, on the sliding-contact surface 56, a plurality of (eight in the present embodiment) oil grooves 58 are formed at intervals in the circumferential direction. The inclined wall portion 54 is provided with a plurality of (eight in the present embodiment) notches 54a through which the hydraulic-oil collecting portion 500 and the area on the sliding-contact surface 56 side communicate with each other at intervals in the circumferential direction.

Figure 7:
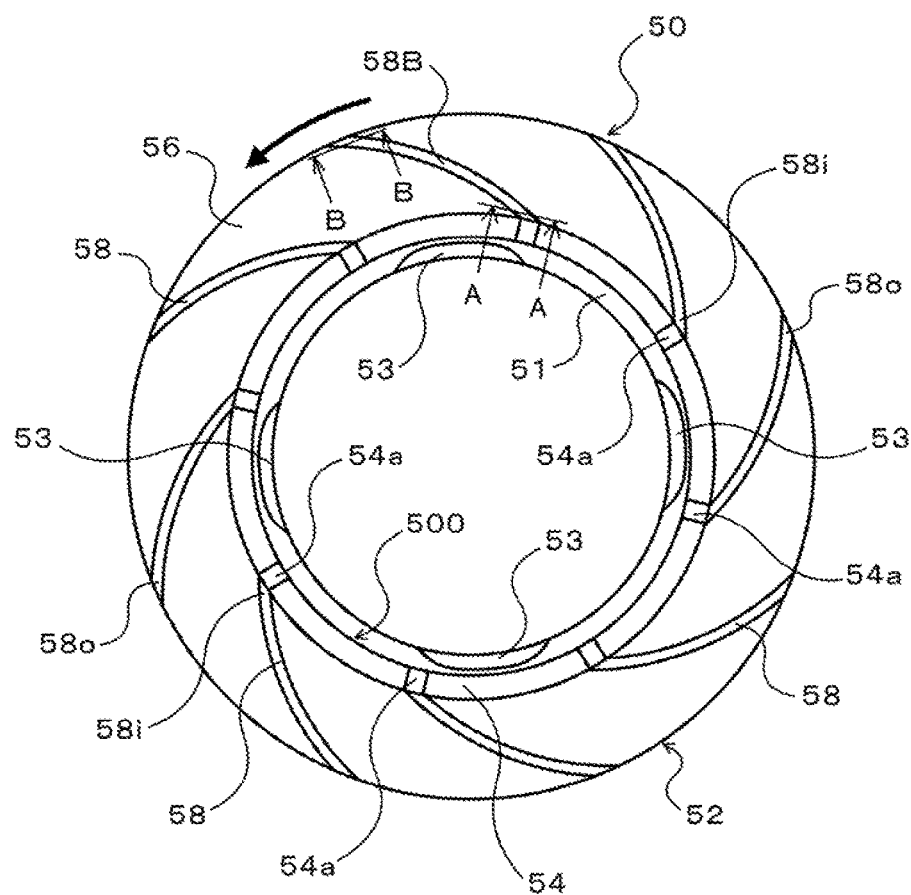
FIG. 7 is a front view of the oil receiver in FIG. 6 when viewed from a sliding surface side.
Figure 8:
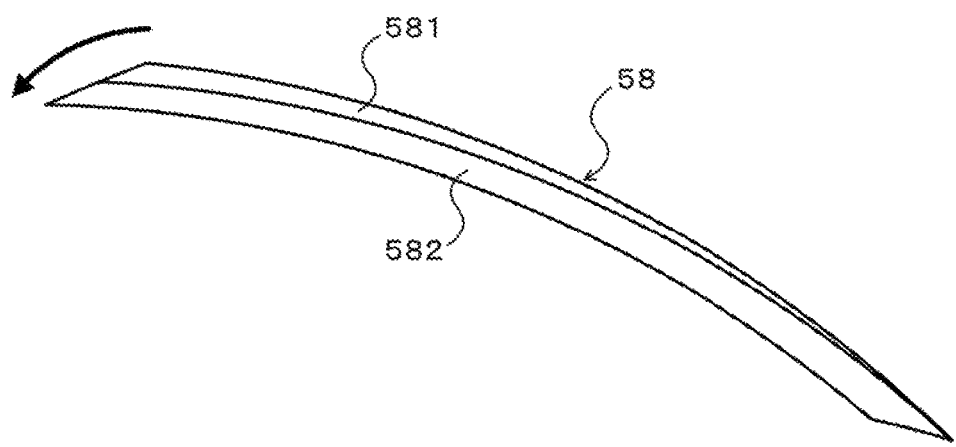
FIG. 8 is a schematic diagram for describing oil grooves formed on the sliding surface of the oil receiver in FIG. 6.
Figure 9:
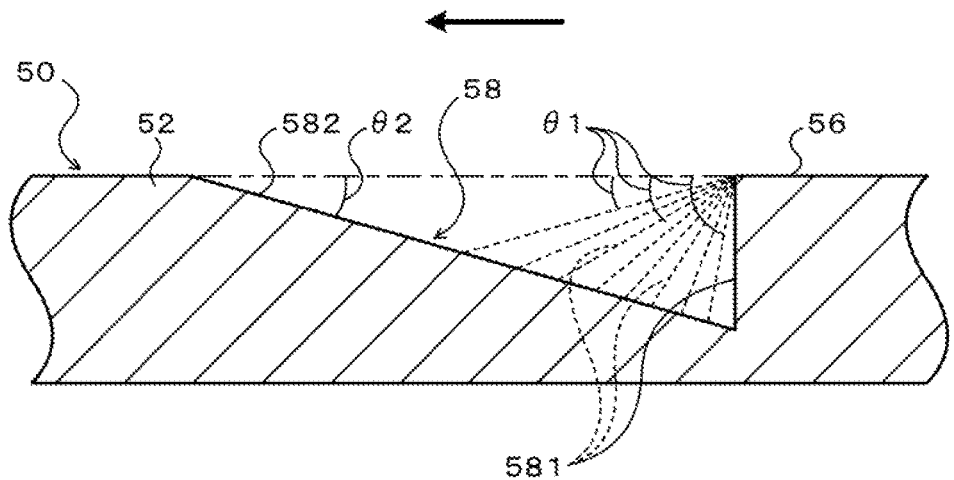
FIG. 9 is a sectional view along line A-A in FIG. 7.
Figure 10:
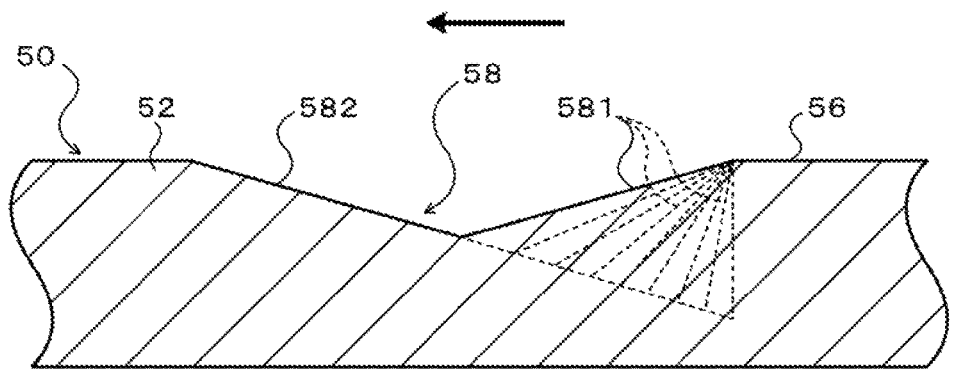
FIG. 10 is a sectional view along line B-B in FIG. 7.

FIG. 7 is a front view of the oil receiver 50 when viewed from the sliding-contact surface 56 side. As shown in FIG. 7, each of the oil grooves 58 is formed on the sliding-contact surface 56 such that the inner peripheral end 58i thereof communicates with the notch 54a and the oil groove 58 is open at the outer periphery of the sliding-contact surface 56, and also the outer peripheral end 58o thereof is positioned on the downstream side of the inner peripheral end 58i in the main rotation direction of the planetary carrier 40, i.e., the rotation direction (see the direction of the arrow in FIG. 8) when the vehicle moves forward. In the present embodiment, each of the oil grooves 58 extends spirally (in a substantially arc-shaped manner) along the main rotation direction of the planetary carrier 40, i.e., in such a manner that a central portion between the inner peripheral end 58i and the outer peripheral end 58o is positioned closer to the outer periphery of the sliding-contact surface 56 than to the inner periphery thereof. As shown in FIG. 8 to FIG. 10, each of the oil grooves 58 has a first bottom surface 581 that is positioned on the upstream side in the main rotation direction (see the direction of the arrow in the figures) of the planetary carrier 40 and a second bottom surface 582 that is positioned on the downstream side in the main rotation direction.

As shown in FIG. 9, at the inner peripheral end 58i, the cross-sectional shape of the oil groove 58 is a right triangle, and the inclination angle θ1 (angle measured counterclockwise from the sliding-contact surface 56 in the figure) of the first bottom surface 581 with respect to the sliding-contact surface 56 is set at 90°. As can be seen in FIG. 10, at the outer peripheral end 58o, the cross-sectional shape of the oil groove 58 is an isosceles triangle, and the inclination angle θ1 of the first bottom surface 581 with respect to the sliding-contact surface 56 and the inclination angle θ2 (angle measured clockwise from the sliding-contact surface 56 in the figure) of the second bottom surface 582 with respect to the sliding-contact surface 56 are set at the same value that is relatively small. As shown in FIG. 8 to FIG. 10, each of the oil grooves 58 is formed such that the inclination angle θ1 of the first bottom surface 581 with respect to the sliding-contact surface 56 gradually decreases from the inner peripheral end 58i toward the outer peripheral end 58o as indicated by the dashed lines in the figure and the width of the second bottom surface 582 in the circumferential direction accordingly narrows. Consequently, the depth of each of the oil grooves 58 gradually decreases from the inner peripheral end 58i toward the outer peripheral end 58o.

Next, a circulation state of hydraulic oil as a lubricating medium around the clutch C2 and the Ravigneaux type second planetary gear mechanism 35 of the automatic transmission 25 described above will be explained.

During operation of the automatic transmission 25, to the first and the second sun gears 36a and 36b of the second planetary gear mechanism 35 and bearings disposed around these sun gears, hydraulic oil as a lubricating medium is supplied through an oil passage, for example, formed in the input shaft 26. The hydraulic oil supplied to the first sun gear 36a and the bearings, for example, lubricates and cools meshing portions between the first sun gear 36a and the short pinion gears 38a and the bearings, and then flow out from meshing portions between gear teeth, bearings, gaps between the first sun gear 36a and the long pinion gears 38b, for example. The hydraulic oil partially flows into (is collected by) the hydraulic-oil collecting portion 500 of the oil receiver 50 attached to the planetary carrier 40 of the second planetary gear mechanism 35.

The hydraulic oil partially collected by the hydraulic-oil collecting portion 500 of the oil receiver 50 flows into the oil passages 55a of the first tubular portions 55 and the oil passages 57a of the second tubular portions 57 through the oil passage 510 by the action of centrifugal force. Furthermore, the hydraulic oil from the hydraulic-oil collecting portion 500 flows into the needle bearings 383 of the short pinion gears 38a through the in-shaft axial oil passages 381a of the first pinion shafts 381 and in-shaft radial oil passages (in-shaft oil passages) 381b communicating therewith, and also flows into the needle bearings 384 of the long pinion gears 38b through the in-shaft axial oil passages 382a of the second pinion shafts 382 and in-shaft radial oil passages (in-shaft oil passages) 382b communicating therewith. This makes it possible to lubricate and cool the needle bearings 383 and 384 and meshing portions, for example, between the short pinion gears 38a and the long pinion gears 38b.

The hydraulic oil partially flowing through the needle bearings 383 and 384 and meshing portions between gear teeth flows out of the planetary carrier 40 through the spaces G of the carrier body 41. The hydraulic oil partially flowing out through the spaces G flows into the vicinity of the separator plates 201 and the friction plates 202 of the clutch C2 that are disposed to surround the planetary carrier 40 to lubricate and cool the separator plates 201 and the friction plates 202. In the planetary carrier 40 of the second planetary gear mechanism 35, as described above, the recess 415r is defined by the inner peripheral surface and the pair of the wall portions 415w of the bridge portion 415. The recess 415r of the bridge portion 415, together with the carrier cover 42, functions as an oil accumulating portion that stores hydraulic oil scattered from the inside (axis side). Thus, the hydraulic oil scattered from the inside, i.e., the side of short pinion gears 38a and the long pinion gears 38b can be stored inside the respective bridge portions 415 so as to be prevented from being excessively discharged outside through the spaces G.

Accordingly, the hydraulic oil stored in the recesses 415r of the respective bridge portions 415 can be sufficiently supplied as a lubricating medium through the oil holes 415h to the friction plates 202 fitted onto the spline 415s and the separator plates 201 disposed adjacently thereto, and thus the clutch C2 can be caused to smoothly operate. In the planetary carrier 40 of the second planetary gear mechanism 35, the bridge portions 415 extend from the shaft support portion 410 of the carrier body 41 so as to be arranged side by side in the circumferential direction with spaces G therebetween, and the long pinion gears 38b each having a long length are exposed outside through the spaces G, which makes it possible to reduce the outer diameter (occupied space) around the bridge portions 415. Consequently, while making the compact planetary carrier 40 of the second planetary gear mechanism 35 including the short pinion gears 38a and the long pinion gears 38b having axial lengths different from each other, it is possible to sufficiently supply hydraulic oil as a lubricating medium to the friction plates 202 supported by the bridge portions 415. The bridge portions may extend from the carrier cover 42, and in this case, the carrier body 41 may be fixed to the distal ends of the bridge portions.

Meanwhile, the hydraulic oil partially collected by the hydraulic-oil collecting portion 500 of the oil receiver 50 reaches the notches 54a formed on the inclined wall portion 54 of the oil receiver 50, and the hydraulic oil reaching the respective notches 54a directly and smoothly flows into the respective oil grooves 58. Herein, as described above, each of the oil grooves 58 is formed such that the outer peripheral end 58o thereof is positioned on the downstream side of the inner peripheral end 58i in the main rotation direction of the planetary carrier 40, and extends spirally along the main rotation direction. Thus, the length of each of the oil grooves 58 from the inner peripheral end 58i to the outer peripheral end 58*o* is longer than an oil groove that extends straight in the radial direction. With this configuration, the oil receiver 50 can delay the time at which hydraulic oil flowing into the oil grooves 58 from the notches 54*a* reaches the outer periphery of the sliding-contact surface 56 by the action of centrifugal force generated when the planetary carrier 40 rotates. The hydraulic oil in the respective oil grooves 58 can be more smoothly fed by the centrifugal force onto the sliding-contact surface 56 on the upstream side of the oil grooves 58 in the rotation direction, i.e., between the sliding-contact surface 56 and the cancel plate 204 of the clutch C2.

In the oil receiver 50, each of the oil grooves 58 is formed such that the depth thereof gradually decreases from the inner peripheral end 58*i* toward the outer peripheral end 58*o*. By increasing the depth of each of the oil grooves 58 on the inner peripheral end 58*i* side in this manner, even when the hydraulic oil in the oil groove 58 is fed to an inner peripheral area on the sliding-contact surface 56 by centrifugal force, the hydraulic oil can still remain in the oil groove 58. The hydraulic oil remaining in the oil groove 58 on the inner peripheral end 58*i* side can be fed out toward the outer peripheral end 58*o* by centrifugal force, and also fed to an outer peripheral area on the sliding-contact surface 56. Furthermore, each of the oil grooves 58 has the first bottom surface 581 positioned on the upstream side in the main rotation direction of the planetary carrier 40 and the second bottom surface 582 positioned on the downstream side in the main rotation direction, and is formed such that the inclination angle θ1 of the first bottom surface 581 with respect to the sliding-contact surface 56 decreases and the width of the second bottom surface 582 in the circumferential direction narrows from the inner peripheral end 58*i* toward the outer peripheral end 58*o*. This makes it possible to smoothly feed the hydraulic oil in the oil groove 58 on the outer peripheral end 58*o* side of the oil groove 58 to an outer peripheral area on the sliding-contact surface 56, and to reduce the amount of oil discharged outside from the oil groove 58 at the outer periphery of the sliding-contact surface 56.

Consequently, even if the sliding-contact surface 56 of the oil receiver 50 comes into sliding contact with the cancel plate 204 of the clutch C2 when the planetary carrier 40 that rotates moves in the axial direction, the hydraulic oil as a lubricating medium can be distributed between the sliding-contact surface 56 and the cancel plate 204 in an extremely satisfactory (even) manner. Thus, it is possible to satisfactorily suppress wear, for example, of the sliding-contact surface 56 associated with the sliding contact with the cancel plate 204 to improve the durability of the oil receiver 50.

Figure 11:
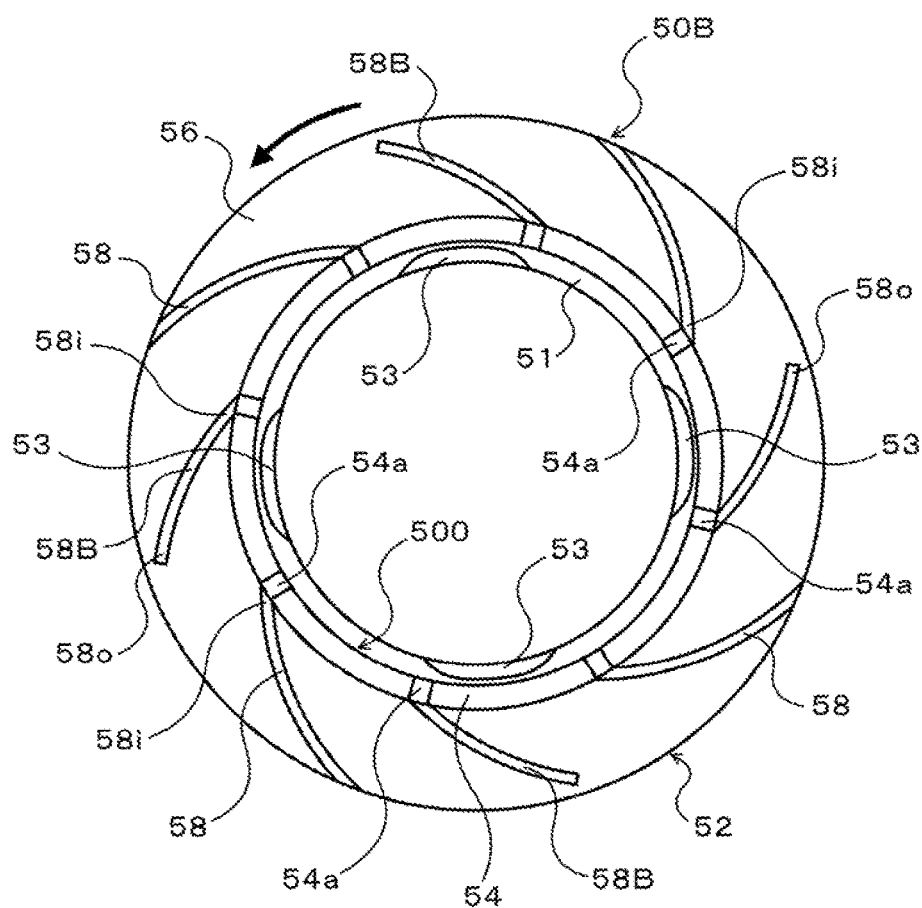
FIG. 11 is a front view of an oil receiver according to another embodiment when viewed from a sliding surface side.

In the embodiment described above, all of the oil grooves 58 are open at the outer periphery of the sliding-contact surface 56, but the structure thereof is not limited to this. Specifically, like the oil receiver 50B shown in FIG. 11 and FIG. 12, at least portions of a plurality of oil grooves 58 and 58B, more specifically, the oil grooves 58B that are disposed alternately with the oil grooves 58 (that are the same as the oil grooves 58 of the oil receiver 50 described above) may be formed so as to be closed on the inner peripheral side with respect to the outer periphery of the sliding-contact surface 56. Each of the oil grooves 58B is formed on the sliding-contact surface 56 such that the inner peripheral end 58*i* thereof communicates with the notch 54*a*. Also, the outer peripheral end 58*o* thereof is positioned on the downstream side of the inner peripheral end 58*i* in the main rotation direction (see the direction of the arrow in FIG. 11) of the planetary carrier 40. Each of the oil grooves 58B extends spirally (in a substantially arc-shaped manner) along the main rotation direction of the planetary carrier 40.

Figure 12:
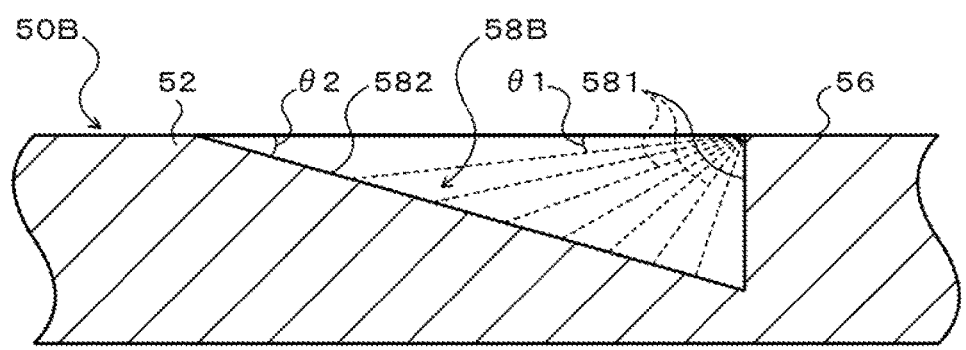
FIG. 12 is a sectional view for describing oil grooves formed on the sliding surface of the oil receiver in FIG. 11.

As can be seen in FIG. 12, the oil groove 58B is also formed such that the depth thereof gradually decreases from the inner peripheral end 58*i* toward the outer peripheral end 58*o*. Specifically, at the inner peripheral end 58*i*, the cross-sectional shape of the oil groove 58B is also a right triangle, and the inclination angle θ1 of the first bottom surface 581 with respect to the sliding-contact surface 56 is set at 90°. Each of the oil grooves 58B is formed such that the inclination angle θ1 of the first bottom surface 581 with respect to the sliding-contact surface 56 gradually decreases from the inner peripheral end 58*i* toward the outer peripheral end 58*o* as indicated by the dashed line in FIG. 12, and the width of the second bottom surface 582 in the circumferential direction accordingly narrows. Because each of the oil grooves 58B is closed at the outer peripheral end 58*o*, as can be seen in FIG. 12, at the outer peripheral end 58*o* (closed end) of the oil groove 58B, the inclination angle θ1 of the first bottom surface 581 with respect to the sliding-contact surface 56 and the inclination angle θ2 of the second bottom surface 582 with respect to the sliding-contact surface 56 are 0°.

By closing at least portions of the oil grooves 58 and 58B on the inner peripheral side with respect to the outer periphery of the sliding-contact surface 56 in this manner, the amount of oil discharged outside from the oil grooves 58 and 58B at the outer periphery of the sliding-contact surface 56 can be reduced, and the hydraulic oil as a lubricating medium can be more satisfactorily distributed between the sliding-contact surface 56 of the oil receiver 50B and the cancel plate 204 disposed adjacently to the planetary carrier 40.

As described above, a planetary carrier according to an exemplary aspect of the present disclosure is a planetary carrier of a planetary gear including a plurality of first pinion gears and a plurality of second pinion gears having longer axial lengths than those of the first pinion gears, the planetary carrier including: a carrier body including a plurality of first shaft support portions that each support one end of a first pinion shaft inserted into each of the first pinion gears, and also including a plurality of second shaft support portions that are arranged alternately with the first shaft support portions along a circumferential direction and each support one end of a second pinion shaft inserted into each of the second pinion gears; a carrier cover that supports the other end of the first pinion shaft and the other end of the second pinion shaft; and a plurality of bridge portions that extend in an axial direction of the first and the second pinion shafts between the first shaft support portions and the carrier cover, and are arranged side by side in the circumferential direction with spaces therebetween. The second pinion gears are disposed so as to be at least partially located in the spaces between the adjacent bridge portions. An outer peripheral surface of each of the bridge portions is provided with a spline onto which a friction engagement plate constituting a friction engagement element is fitted. An inner peripheral surface of each of the bridge portions is provided with a pair of wall portions that extend in the axial direction along side edges on both sides of the bridge portion and protrude radially inward. Each of the bridge portions is provided with a plurality of oil holes through which an inside and an outside of the bridge portion communicate with each other.

In other words, the planetary carrier according to the present disclosure is structured with the carrier body and the carrier cover that support the first pinion shafts inserted into the first pinion gears and the second pinion shafts inserted into the second pinion gears. The carrier body includes the first shaft support portions that each support one end of each of the first pinion shafts inserted into each of the first pinion gears, and also includes the second shaft support portions that are arranged alternately with the first shaft support portions along the circumferential direction and each support one end of each of the second pinion shafts inserted into each of the second pinion gears. The carrier cover supports the other end of each of the first pinion shafts and the other end of each of the second pinion shafts. Furthermore, between the first shaft support portions and the carrier cover, the bridge portions are provided that extend in the axial direction of the first and the second pinion shafts and are arranged side by side in the circumferential direction with spaces therebetween. The second pinion gears are disposed so as to be at least partially located in the spaces between the adjacent bridge portions. Furthermore, in this planetary carrier, the outer peripheral surface of each of the bridge portions is provided with the spline onto which the friction engagement plate constituting the friction engagement element is fitted. The inner peripheral surface of each of the bridge portions is provided with the pair of wall portions that extend in the axial direction along the side edges on both sides of the bridge portion and protrude radially inward. Each of the bridge portions is provided with the oil holes through which the inside and the outside of the bridge portion communicate with each other.

In this manner, the bridge portions are provided so as to be arranged side by side in the circumferential direction between the first shaft support portions of the carrier body and the carrier cover, and the second pinion gears are disposed so as to be at least partially located in the spaces between the adjacent bridge portions, whereby the outer diameter (occupied space) of the planetary carrier around the bridge portions can be reduced. In this planetary carrier, the carrier cover and the inner peripheral surface and the pair of wall portions of each of the bridge portions define an oil accumulating portion that stores hydraulic oil scattered from the inside (axis side). Thus, the hydraulic oil scattered from the inside can be stored inside the bridge portions so as to be prevented from being discharged outside through the spaces, and then the hydraulic oil as a lubricating medium can be supplied through the oil holes to the friction engagement plate fitted onto the spline. Consequently, while making the compact planetary carrier of the planetary gear including the first and the second pinion gears having axial lengths different from each other, it is possible to sufficiently supply the hydraulic oil as a lubricating medium to the friction engagement plates supported by the bridge portions.

The first shaft support portions of the carrier body may be a plurality of thick portions that are arranged side by side in the circumferential direction with spaces between the bridge portions, the second shaft support portions may be a plurality of thin portions that are molded integrally with the thick portions, and the first pinion gears may be disposed between the carrier cover and the thick portions and radially inward of the bridge portions. In this manner, the shaft support portions are provided with the thick portions and, from each of the thick portions, the bridge portion extends together with the thick portion, which makes it possible to appropriately increase the torsional rigidity of the carrier body, and consequently the torsional rigidity of the planetary carrier.

Furthermore, the first pinion gears and the second pinion gears may mesh with each other, and the planetary gear may be a Ravigneaux type planetary gear having a first sun gear meshing with the first pinion gears, a second sun gear meshing with the second pinion gears, and a ring gear meshing with the second pinion gears. However, the planetary gear including the planetary carrier according to the present disclosure is not limited to the Ravigneaux type planetary gear if the planetary gear includes the first and the second pinion gears having axial lengths different from each other.

The bridge portions may extend from the respective first shaft support portions, and the carrier cover may be fixed to distal ends of the bridge portions. However, the bridge portions may extend from the carrier cover, and the carrier body may be fixed to the distal ends of the bridge portions.

Furthermore, the second pinion gears may be partially located within a range of radial thickness of the bridge portions.

The present disclosure is not limited to the embodiment described above and, needless to say, various changes may be made without departing from the scope of the present disclosure. Furthermore, the mode for carrying out the disclosure described above is merely one specific mode of the disclosure described only in the "SUMMARY", and does not limit the elements of the disclosure described in the "SUMMARY".

INDUSTRIAL APPLICABILITY

The present disclosure is applicable to the manufacturing industry, for example, of planetary gears and transmissions including the planetary gears, for example.

The invention claimed is:

1. A planetary carrier of a planetary gear including a plurality of first pinion gears and a plurality of second pinion gears having longer axial lengths than those of the first pinion gears, the planetary carrier comprising:
   a carrier body including:
      a plurality of first shaft support portions that each support one end of a first pinion shaft inserted into each of the first pinion gears, and
      a plurality of second shaft support portions that are arranged alternately with the first shaft support portions along a circumferential direction and each support one end of a second pinion shaft inserted into each of the second pinion gears;
   a carrier cover that supports the other end of the first pinion shaft and the other end of the second pinion shaft; and
   a plurality of bridge portions that extend in an axial direction of the first and the second pinion shafts between the first shaft support portions and the carrier cover, and are arranged side by side in the circumferential direction with spaces between the bridge portions, wherein
      the second pinion gears are disposed so as to be at least partially located in the spaces between the adjacent bridge portions,
      an outer peripheral surface of each of the bridge portions is provided with a spline onto which a friction engagement plate constituting a friction engagement element is fitted,
      an inner peripheral surface of each of the bridge portions is provided with a pair of wall portions that extend in the axial direction along side edges on both sides of each of the bridge portions and protrude radially inward, and
      each of the bridge portions is provided with a plurality of oil holes through which an inside and an outside of each of the bridge portions communicate with each other.

2. The planetary carrier according to claim 1, wherein:
the first shaft support portions of the carrier body are a plurality of thick portions that are arranged side by side in the circumferential direction with the spaces between the bridge portions, and the second shaft support portions are thin portions that are molded integrally with the thick portions, and
the first pinion gears are disposed between the carrier cover and the first shaft support portions and radially inward of the bridge portions.

3. The planetary carrier according to claim 2, wherein the first pinion gears and the second pinion gears mesh with each other, and
the planetary gear is a Ravigneaux type planetary gear having a first sun gear meshing with the first pinion gears, a second sun gear meshing with the second pinion gears, and a ring gear meshing with the second pinion gears.

4. The planetary carrier according to claim 3, wherein:
the bridge portions extend from the respective first shaft support portions, and
the carrier cover is fixed to distal ends of the bridge portions.

5. The planetary carrier according to claim 4, wherein:
the second pinion gears are partially located within a range of radial thickness of the bridge portions.

6. The planetary carrier according to claim 3, wherein:
the second pinion gears are partially located within a range of radial thickness of the bridge portions.

7. The planetary carrier according to claim 2, wherein:
the bridge portions extend from the respective first shaft support portions, and
the carrier cover is fixed to distal ends of the bridge portions.

8. The planetary carrier according to claim 7, wherein:
the second pinion gears are partially located within a range of radial thickness of the bridge portions.

9. The planetary carrier according to claim 2, wherein:
the second pinion gears are partially located within a range of radial thickness of the bridge portions.

10. The planetary carrier according to claim 1, wherein:
the bridge portions extend from the respective first shaft support portions, and
the carrier cover is fixed to distal ends of the bridge portions.

11. The planetary carrier according to claim 10, wherein:
the second pinion gears are partially located within a range of radial thickness of the bridge portions.

12. The planetary carrier according to claim 1, wherein:
the second pinion gears are partially located within a range of radial thickness of the bridge portions.

* * * * *